US010384870B2

(12) United States Patent
Geiger et al.

(10) Patent No.: US 10,384,870 B2
(45) Date of Patent: Aug. 20, 2019

(54) METHOD AND DEVICE FOR ORDER PICKING IN WAREHOUSES LARGELY BY MACHINE

(71) Applicant: GRENZEBACH MASCHINENBAU GmbH, Asbach-Baeumenheim (DE)

(72) Inventors: Ruediger Geiger, Genderkingen (DE); Gunar Baier, Mannheim (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 398 days.

(21) Appl. No.: 15/034,253

(22) PCT Filed: Nov. 18, 2014

(86) PCT No.: PCT/DE2014/000591
§ 371 (c)(1),
(2) Date: May 4, 2016

(87) PCT Pub. No.: WO2015/070841
PCT Pub. Date: May 21, 2015

(65) Prior Publication Data
US 2016/0280461 A1    Sep. 29, 2016

(30) Foreign Application Priority Data
Nov. 18, 2013 (DE) .................. 10 2013 019 368

(51) Int. Cl.
*B65G 1/04* (2006.01)
*B66F 9/06* (2006.01)
(Continued)

(52) U.S. Cl.
CPC ............. *B65G 1/0492* (2013.01); *B65G 1/10* (2013.01); *B65G 1/1373* (2013.01);
(Continued)

(58) Field of Classification Search
USPC ....... 414/265, 266, 273, 279, 349, 467, 555, 414/807, 812, 909; 901/1
See application file for complete search history.

(56) References Cited

U.S. PATENT DOCUMENTS 4,698,775 A   10/1987  Koch et al.
4,926,544 A    5/1990  Koyanagi et al.
              (Continued)

FOREIGN PATENT DOCUMENTS

WO     2010085944      8/2010

OTHER PUBLICATIONS

Gawrilow, E., et al., "Dynamic Routing of Automated Guided Vehicles in Real-time," Technische Universitaet Berling, Oct. 10, 2007, No. 039.
(Continued)

*Primary Examiner* — Saul Rodriguez
*Assistant Examiner* — Willie Berry, Jr.
(74) *Attorney, Agent, or Firm* — Duane Morris LLP; Gregory M. Lefkowitz; Jason M. Nolan

(57) ABSTRACT

A method and device for order picking in a warehouse with an independently freely movable transport vehicle is disclosed. The device includes a vehicle housing having a carrier plate adapted for accommodating and transporting a load rack having transportable goods, a robot adapted for grasping goods, a transverse link connecting drive wheels, which are in each case by way of an angular lever pivotable about a rotation axis, such that the drive wheels are configured to execute mutually independent vertical motions, a centrally arranged actuating element for moving two front lifting rods and two rear lifting rods with a lifting rotary lever and a push rod connected to the lifting lever in order to raise or lower the carrier plate, and a 3-D scanner, light field sensor, and WLAN antenna.

13 Claims, 6 Drawing Sheets

Figure 1:
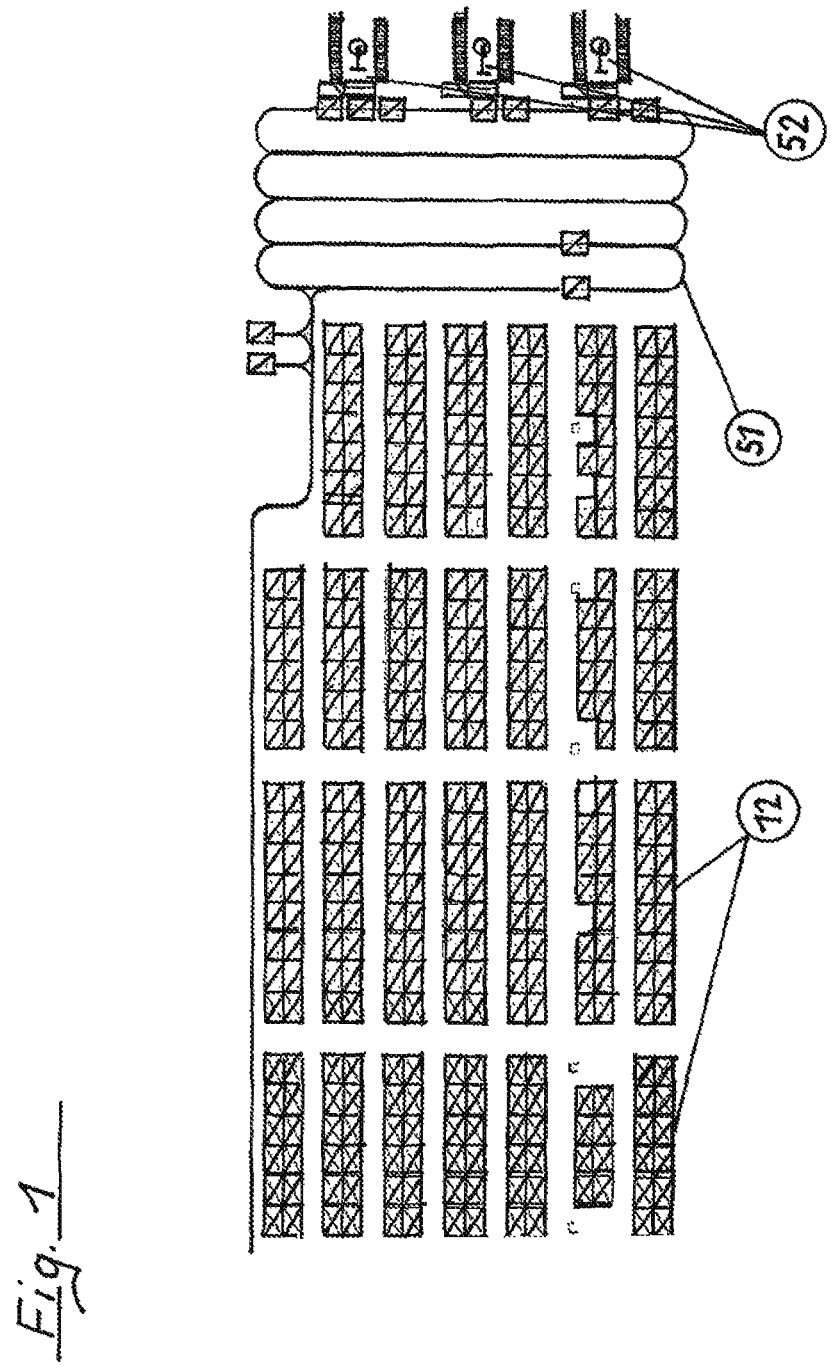

(51) Int. Cl.
*B65G 1/137* (2006.01)
*B65G 1/10* (2006.01)
*B66F 9/075* (2006.01)
*B66F 9/18* (2006.01)

(52) U.S. Cl.
CPC ............ *B65G 1/1375* (2013.01); *B66F 9/063* (2013.01); *B66F 9/07572* (2013.01); *B66F 9/18* (2013.01)

(56) References Cited

U.S. PATENT DOCUMENTS

| | | |
|---|---|---|
| 5,280,431 A | 1/1994 | Summerville et al. |
| 2007/0063500 A1* | 3/2007 | Eaton ................... B25J 5/007 280/762 |
| 2007/0288123 A1 | 12/2007 | D'Andrea et al. |
| 2007/0290040 A1 | 12/2007 | Wurman et al. |
| 2010/0076631 A1* | 3/2010 | Mian ................... G05D 1/0229 701/19 |
| 2011/0093134 A1 | 4/2011 | Emanuel et al. |
| 2011/0128412 A1 | 6/2011 | Milnes et al. |

OTHER PUBLICATIONS

Gunter Ullrich, "Geschichte der Fahrerlosen Transportsysteme" Springer Fachmedien Wiesbaden GmbH: Vieweg + Teubner Verlag, 2011, ISBN 978-3-8348-0791-5. English translation of German Office Action dated Dec. 18, 2014, received in corresponding German Application No. 10 2013 020 851.3, discussing Ullrich (D2) on p. 5.

\* cited by examiner

METHOD AND DEVICE FOR ORDER PICKING IN WAREHOUSES LARGELY BY MACHINE

CROSS-REFERENCE TO RELATED APPLICATIONS

This application is a § 371 national stage entry of International Application No. PCT/DE2014/000591, filed Nov. 18, 2014, which claims priority to German Patent Application No. 10 2013 019 368.0, filed Nov. 18, 2013, the entire contents of which are incorporated herein by reference.

The present invention relates to a method and a device for order picking in warehouses largely by machine.

In the age of digitization of human culture, this development has also encompassed the field of the distribution of products in department stores. The precursors of department stores were the roofed shopping passages of the early 19th century, in which hundreds of individual traders jointly presented their products according to the oriental pattern, for example, the grand bazaar of 1825 in Paris. The department store was the first of the modern large-scale forms of retail, which displaced the role of the small merchant by the overpowering competition thereof.

This development has resulted in the present time in sales structures, which offer the highly diversified product assortment thereof via Internet and ship worldwide.

To prepare an order for a specific customer, packets having different placement or packages have to be assembled. Providing individual components of such an order can be performed by hand or by means of automatic guided vehicles in this case. Such so-called AGVs (automatic guided vehicles) can be mobile robots or vehicles constructed especially for the respective intended purpose, which are moved from one location to another using a special guiding and control method.

Conventional automatic guided vehicles, using which, for example, materials are moved in factories and warehouses, have a minimal point-to-point movement controller. Most such systems use AGVs, which follow a fixed guide lane. In general, this is a high-frequency transmitting antenna wire, which is arranged countersunk in the factory floor, a reflective strip painted onto the floor, or a reflective tape glued onto the floor. Such guide lanes are, however, obviously very vulnerable and unreliable.

All of these movement controllers limit the movement freedom of the individual AGVs, in that they are forced to follow a physically fixed path.

Most such systems rely on internal-vehicle proximity detection to avoid collisions with other vehicles, stationary objects, or human personnel. In such systems, the AGVs can only move in one direction along the lane they are following.

These systems achieve a point-to-point movement by implementing control schemes and using freely movable AGVs having programmable bidirectional paths. In this way, multiple AGVs can be located without collisions or excess backup simultaneously on the same paths. This method maximizes the degree of freedom of the AGV movement. The control scheme implements a scheme of the "static" collision avoidance for AGV systems in this case. A computer program is essentially used in this case to study the respective environment of an AGV, to ascertain only those paths which are navigable for the AGVs. A further allocation program draws the required data from this to move AGVs in the respective system from one point to another point, without two AGVs navigating the same path simultaneously.

The disadvantages of these methods from the prior art are that they are restricted either to closed paths, unidirectional movement, the lack of the external control of the AGV movement, or the "static" collision avoidance.

To avoid these disadvantages, a method is known from DE 689 28 565 T2, according to the specifications in patent claim 1, for guiding multiple automatically guided vehicles (AGV) along a network of paths connected to one another, which begin and end at node points and contain node points.

In this method, a recording of a route to be followed by the specific AGVs is prepared in the form of path sections which begin at one node point and end at the next node point.

Furthermore, a specification of the position of a specific AGV is determined.

In addition, a specification is derived for each node point as to whether it is free or occupied.

Furthermore, a list of node points is generated for a specific AGV, which contains the node point currently sought out by the specific AGV and at least several node points along the recorded route, which the specific AGV will seek out. This takes place including the checking that each node point in the list is free, before it is incorporated in the list, and the marking of each node point in the list as occupied, after it is incorporated in the list. Furthermore, the list of node points is transmitted to the specific AGVs and it is prompted to move along the recorded route through the node points.

Using such automatic guided vehicles, individual components of such an order may be provided, but assembling the special components to form an order has heretofore exclusively had to have been performed by hand.

It is the object of the present invention to provide an autonomous transport vehicle, using which the rapid transport of load racks in large factory halls can be executed without interference, even on uneven floors and slight inclines, and using which the picking of an order can be performed largely by machine.

This object is achieved by the device according to Claim 1: a device for picking orders largely by machine in warehouses by means of independently freely movable transport vehicles, having the following features:

a) a vehicle housing (3) having a carrier plate (1) for receiving and transporting a load rack (12) with transport material (13), having two drive wheels (6), which are separately driven on both sides in the middle of the vehicle housing (3) on a separately mounted axis of rotation (5) in each case, wherein at least one support wheel (9, 21) is provided in each case on the front side and on the rear side of the vehicle housing (9), and wherein the carrier plate (1) carries a load rack (12) with a light robot (15) having means for grasping products, and wherein the light robot (15) has a light field sensor (48) in the region of these means, b) a wishbone (34) which connects drive wheels (6), which are pivotable about the axis of rotation (5) in each case via an angle lever (40) so that these drive wheels can execute vertical movements independently of one another, c) a centrally arranged positioning element (31), which, via a lift-turn lever (27) and a pushrod (24) connected thereto, can move two front lift rods (19) and two rear lift rods (16) to raise or lower the carrier plate (1), d) at least one 3D scanner (10) and at least one light field sensor (59) as well as at least one WLAN antenna (11) in the front region of the vehicle housing (3).

Claim 2: the device as claimed in claim 1, characterized in that the light robot (15) takes the gripper means determined to be suitable in each case from a gripper magazine (46) by means of a quick-release coupling (47) to be actuated automatically.

Claim 3: the device as claimed in any one of the preceding claims,
characterized in that a system for power supply of the transport vehicle is provided, which ensures the supply of electric, liquid, or gaseous energy either via inductive lines laid in the floor, by means of an inductive pickup element (14), or via stationary approachable energy supply stations, wherein storage space (28) for corresponding energy stores is provided in the vehicle housing (3).

Claim 4: the device as claimed in any one of the preceding claims,
characterized in that the center of gravity of a load rack (12) is detected by means of sensors, and the result of such a center of gravity determination is used to correct the center of gravity location by means of the controller of the positioning elements (18) and (17) for the lift rods (19) and (16).

and/or the method according to

Claim 5: a method for picking orders largely by machine in warehouses by means of independently freely movable transport vehicles, having the following features:
a) a control center in a storage region receives the order to ensure that a part of a product group is transported in a specific load rack (12) to a specific destination,
b) the control center determines which transport vehicle is capable, on the basis of its present location and its present order status, of handling the delivered order most rapidly,
c) a specific transport vehicle with a loaded light robot (15) thereupon receives from the control center the order to seek a specific load rack (12) having a specific product group in a specific area of a larger area of a storage region, to remove an exemplar of this product group by means of the light robot (15), to supply a container with transport material (13), to travel to a specific storage space, wherein the transport vehicle selected by the control center receives the instructions, which are determined by means of a specific route algorithm, with respect to the route to be traveled and the speed to be traveled at in each route section to reach the immediate target region in a specific time window,
d) the relevant transport vehicle delivers the exemplar of the desired product group to a load rack (58) with picking product, in the region of a picking person (60), or in the region of a shipping and packing person (61).

Claim 6: the method as claimed in claim 5:
characterized in that the picking product is stored by picking persons (60) in various transport containers and is transported to various shipping and packing persons (61).

Claim 7: the method as claimed in claim 6,
characterized in that instead of the persons (60) and (61), a six-axis robot (53) in the region of a sorting space (56) collects the product groups associated with an order and delivers them to a device (57) for product packing, wherein it brings them to a load rack (55) for ready-to-ship products after the packing.

Claim 8: the method as claimed in claim 7,
characterized in that the light robot (15) takes the gripper means determined to be suitable in each case from a gripper magazine (46) by means of a quick-release coupling (47) to be actuated automatically.

Claim 9: the method as claimed in any one of claims 5 to 8,
characterized in that the center of gravity of the load rack (12) is detected by means of sensors, and the result of such a center of gravity determination is used to control the positioning elements (18) and (17) for the lift rods (19) and (16), and in that the gradient of a load rack (12) is determined by means of a gradient sensor.

Claim 10: the method as claimed in any one of claims 5 to 9,
characterized in that sensors (42) are provided for detecting the rotational movement of the drive wheels (6), which can also determine the slip on each drive wheel (6) as a function of the speed of the transport vehicle.

Claim 11: a computer program having a program code for carrying out the method steps as claimed in any one of claims 5 to 10 when the program is executed in a computer.

Claim 12: a machine-readable carrier having the program code of a computer program for carrying out the method as claimed in any one of claims 5 to 10 when the program is executed in a computer.

The device according to the invention will be described in greater detail hereafter. In the specific figures:

FIG. 1: shows an overview of products as transport material

Figure 2:
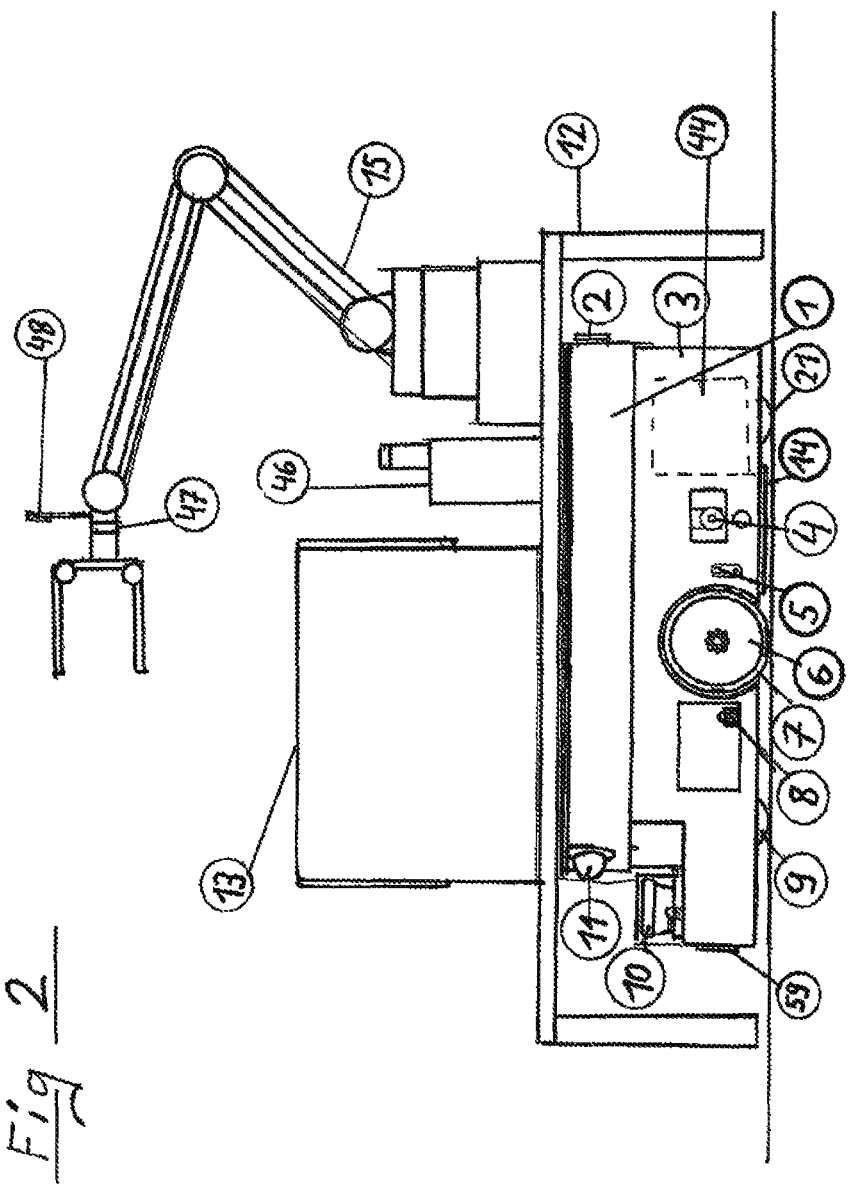

FIG. 2: shows an exemplary device for moving transport material

Figure 3:
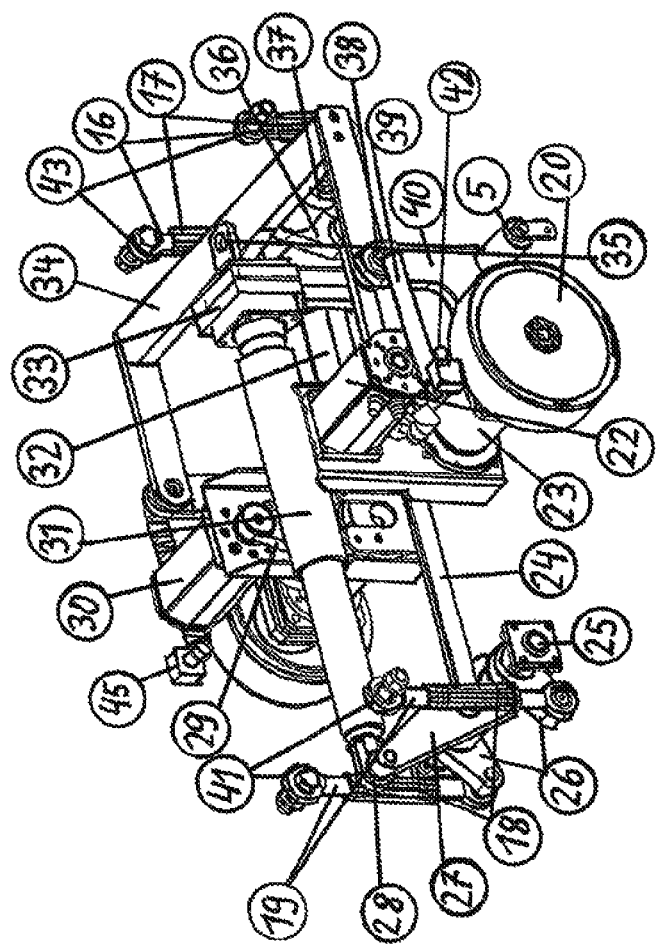
Figure 4:
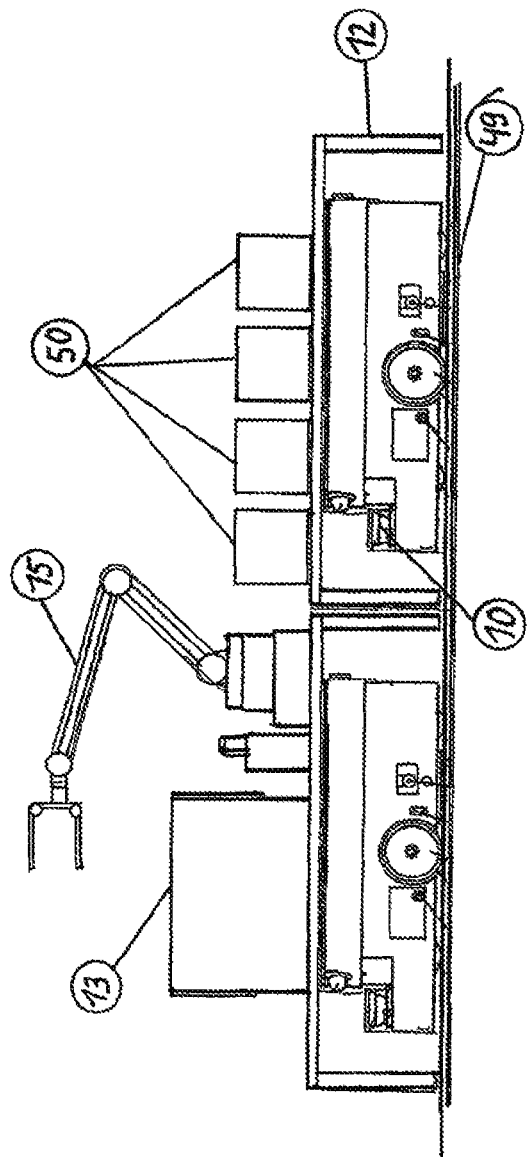
Figure 5:
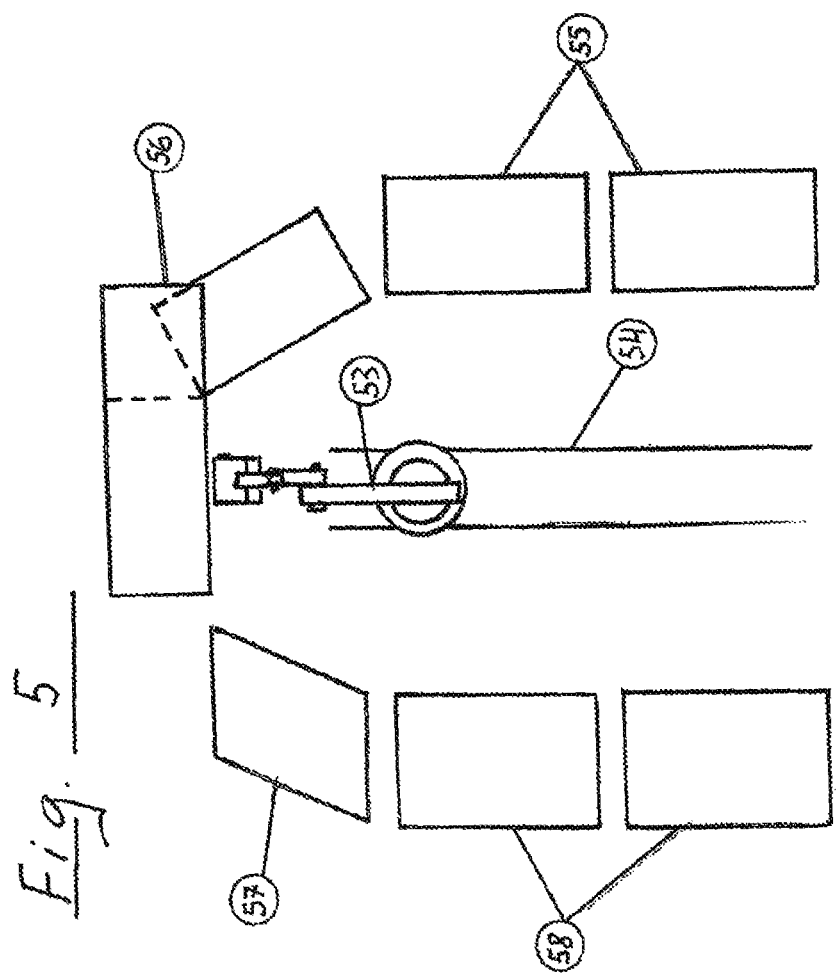
Figure 6:
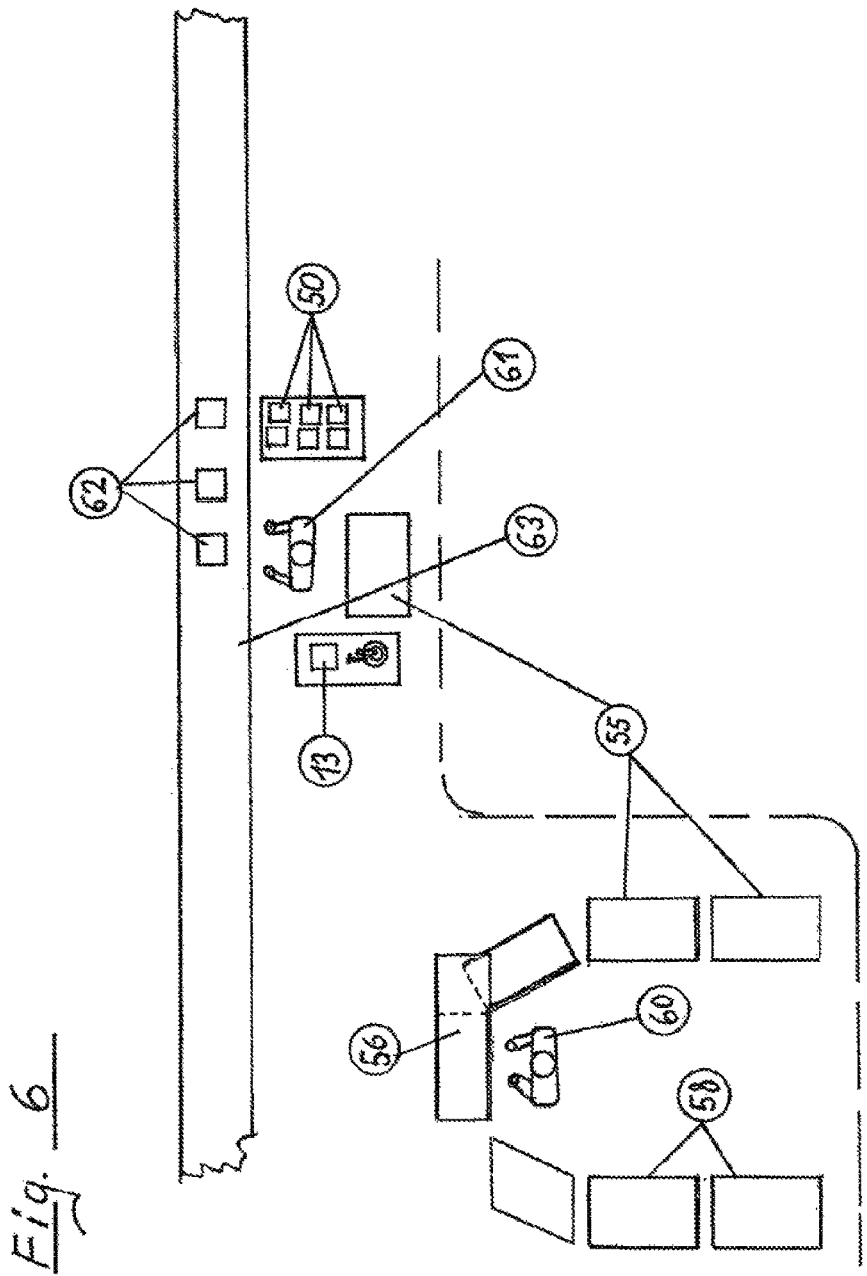

FIG. 3: shows a spatial illustration of the kinematics of a transport vehicle FIG. 4: shows the filling of containers with picked products FIG. 5: shows an illustration of the assembly of product orders FIG. 6: shows an alternative assembly of product orders FIG. 1 shows an overview of a warehouse having picking spaces. A warehouse having a collection of load racks 12 arranged in rows is shown here as an example. Three picking spaces 52 having packing stations can be recognized from above on the right side of FIG. 1. Waiting loops of vehicles are identified with 51.

FIG. 2 shows the movement of products as transport material. A load rack 12 is shown here as an example, which only carries one item of transport material 13 with light robot 15. In practice, the load racks 12 have multiple compartments, each having a plurality of identical or different transport materials. Furthermore, FIG. 2 shows a side view of a transport vehicle, which has raised this load rack 12 with the light robot 15 fastened thereon onto a carrier plate 1 from the floor by means of a lifting mechanism. This lifting mechanism will be explained later. The housing 3 enclosing the transport vehicle has, in this view, a display screen 2, which is shown from the side. This display screen 2 can give information about the type and the composition of the cargo located on the load rack, and also about the storage space from which the load material was retrieved, and also about the destination to which it will be conveyed. Furthermore, the charge state of the battery or energy stores which drive the transport vehicle can also be displayed on the display screen 2.

To have manual access to the operation of the transport vehicle from the outside, the operating element 4 shown is installed. For example, an emergency stop of the transport vehicle can be provided here. However, multiple control options, which form a group of operating elements, for engagements of a manual nature can also be provided in the scope of this operating element 4.

Furthermore, a drive wheel 6 is shown in the travel direction in the view shown, which corresponds to a further drive wheel 6 on the other, opposite side. The front side of the transport vehicle is located on the left side of FIG. 2. In addition to the drive wheel 6, a position point is shown on the right in this view, which identifies the position of an axis of rotation 5.

The drive wheel 6 can be pivoted about the axis of rotation 5 by means of an angle lever, which is concealed in this view of the housing. In this way, it is ensured that in the event of a lateral inclination of the transport vehicle, which is caused by floor irregularities, the drive wheel 6 maintains contact with the running surface of the floor. The cover of the drive wheel 6 is identified with 7 and is embodied so that it ensures maximum friction on the running surface of the respective provided floor. The plug connection 8, which is shown adjacent to the drive wheel 6, enables the charging of the energy store, which drives the drive system of the transport vehicle. This can be electric batteries, liquid gas stores, or other energy stores. Support wheels, of which the front is identified with 9 and the rear with 21 in this illustration, are used to support the transport vehicle.

A commercially available 3D scanner 10 is installed on the front side of the transport vehicle to recognize risks of collisions, in particular inattentive persons, early and be able to avoid a collision with them.

A WLAN antenna 11 is used for the communication with a control center, which controls the transport vehicle.

The transport material 13 is represented by a possible container here, which can be filled by the light robot 15.

An inductive pickup element for electrical energy is identified with 14. Not only can electrical energy be absorbed by the energy stores arranged in the transport vehicle during travel, but control commands may also additionally or alternatively be transmitted via the lines installed in the floor for this purpose. Instead of inductively active lines, which are permanently installed in the floor, fixed stations intended for this purpose can also be approached by a transport vehicle. Mobile inductively active energy transmitters, in the form of mats or plates located on the floor for energy transmission, can also be used.

Furthermore, a light field sensor 59 is attached to the front side of the transport vehicle.

With respect to the light field sensor 59 used, reference is made to the new development of so-called mini-lenses, which collect items of optical information in the form of hundreds of mini-lenses according to the light field principle, which can then be assembled later into images having a desired resolution and/or a desired viewing angle by data processing. Such mini-lenses are 3-D capable, inexpensive to produce, and follow the principle of an insect eye.

In conjunction with the 3D scanner 10, it is more easily possible for the transport vehicle to navigate between the collection of load racks 12 and to adequately deal with unexpectedly occurring obstructions.

A storage space for energy stores is identified with 44. Both stores for electrical energy and also stores for chemically stored energy are usable as energy stores.

Furthermore, a gripper magazine 46 is located on the load rack 12 shown in FIG. 2. Various types of gripper tools are arranged in this gripper magazine 46 in a defined arrangement, which the light robot can access easily. Such gripper tools can be changed automatically by the light robot 15 by means of a quick-release coupling 47.

A further light field sensor 48 is located in the region shown in FIG. 2 for this purpose and above all for assistance with the access to products to be grasped.

FIG. 3 shows a spatial illustration of the kinematics of a transport vehicle. This figure shows the transport vehicle without the surrounding housing 3. Reference is made to connections to the housing 3 at the appropriate point. Firstly the kinematics of the drive wheels will be explained.

In the foreground, the left-side drive wheel, which is known from FIG. 2 and is identified with 20 here, and the axis of rotation 5 can be seen on the housing. The axle bearing 23 for the left-side drive wheel 20 and the servomotor 22 located above it are connected to form a functional unit by means of an angle bracket, which is not identified in greater detail here and is only visible from the rear. In this angle bracket, a toothed belt runs via which the servomotor 22 drives the axis of rotation of the left-side drive wheel 20.

On the opposite side, the corresponding servomotor 30 for the right-side drive can be seen. The corresponding angle bracket is visible from the rear on this side.

The corresponding toothed belt 29 running in this angle bracket can be recognized here. The entire functional unit, consisting of the drive wheel 20 with the axle bearing 23, the servomotor 22, and the angle bracket with its toothed belt, is pivotable via an angle lever 40 about the axis of rotation 5. The angle lever 40 is fastened via a joint 38 on a U-shaped wishbone 34, on the other end of which the right-side drive wheel is fastened accordingly. Furthermore, a spring element 39 is mounted on the joint 38, the other mounting point of which is fastened on the housing. This linkage point is shown as a block-shaped, hardly recognizable mount on the left side of the transport vehicle visible in FIG. 3. In contrast, this point is identified as the linkage point 45 of the right spring element on the opposite side. The spring element 39 is used for the purpose of pressing the drive wheel 20 onto the floor surface via the angle lever 40 and therefore to improve the floor contact of the respective drive wheel 20.

This applies accordingly for the opposing right drive wheel. A sensor 42 for detecting the rotational movement of the left-side drive wheel 20 can also be recognized in this region. In this manner, the slip on this drive wheel can be determined as a function of the speed of the transport vehicle. This applies accordingly for the right-side drive wheel. The additional items of information thus determined can be used for controlling the transport vehicle and for improving the positional stability of the transport vehicle.

A further kinematic device will be explained hereafter for raising a load rack 12.

To be able to pick up a load rack, it is necessary for the transport vehicle to lift the load rack after driving underneath it and to detach its ground contact to be able to transport it.

The front lift rods 19 and the rear lift rods 16 are used in direct contact for this purpose.

The lift rods 19 and 16 are raised and lowered by means of a positioning element 31, which applies the forces required for this purpose by means of a threaded spindle via an extendable and retractable cylinder via a joint head 28 and a linked-on lift-turn lever 27.

It can be seen clearly on the left side in FIG. 3 how the lift-turn lever 27, in cooperation with a front lift rod lever 26 in each case, causes the required location changes of the two front lift rods 19 by means of corresponding rotational movements about an axis of rotation 25. The front lift rods 19 each support the corresponding front carrier plate suspension 41.

At the same time, it can be inferred from this region of FIG. 3 that a push rod 24 is linked on the lift-turn lever 27, which transmits the movements of the lift-turn lever 27 via an axle lever 36 to the rear lift rod lever 37. The movements of the rear lift rod lever 37 result in the required location changes of the two rear lift rods 16.

The rear lift rods 16 each support the corresponding rear carrier plate suspension 43.

The movement of the positioning element 31 is performed via a drive 32 and a force transmission 33, which redirects the force. The force transmission 33 is fastened by means of a fork head 35 on the wishbone 34.

Since the fork head 35 is mounted so it is rotatable on the wishbone 34, the wishbone 34, as the connecting element, can move between the angle levers 40 and it is thus made possible for the two drive wheels to execute vertical pivot movements independently of one another.

The positioning elements 18 for the front lift rods 19 and the positioning elements 17 for the rear lift rods 16 are identified in FIG. 3 as blackened regions of the corresponding lift rods. Using them, the respective lift rods may change the vertical location thereof individually and/or in combination. In addition, the center of gravity of a load rack is detected by means of sensors (not shown in greater detail). The result of such a center of gravity determination can be used to control the positioning elements 18 and 17 for the lift rods 19 and 16 and therefore to enable corrections which appear necessary in the location of the center of gravity of a transport vehicle.

Overall, by way of the arrangement shown of the lift rods 19 and 16, the lever assembly 36, 24, 26, 27 located in between, and the positioning element 31 in cooperation with the wishbone 34, as well as its action on the angle lever 40, the center of gravity of the load of the load rack is located directly in the region of the drive wheels. The support wheels therefore essentially have only a stabilizing function.

FIG. 4 shows the filling of containers with picked products.

In this illustration, two transport vehicles having load racks 12 are shown, of which one is equipped with a light robot 15, wherein a larger container is carried by the relevant load rack as the transport material 13.

In this case, the transport material 13 can just have been loaded or unloaded by means of the light robot 15.

A transport vehicle is located adjacent thereto, having a load rack 12 which is equipped with multiple smaller picked product containers 50. An induction line 49 is shown as an example in the floor. In this transport vehicle, the 3D scanner 10 is identified to show that both transport vehicles can navigate independently of one another by means of their sensor equipment. The illustration of FIG. 4 also permits the interpretation that picked products are moved from the container of the transport material 13 into the picked product container 50 by means of the light robot 15.

In the type of meeting shown in FIG. 4, in warehouses according to FIG. 1, a plurality of transport vehicles with light robots 15 are underway in addition to a plurality of conventional transport vehicles to perform their tasks. In addition to the identification of the various load racks by means of barcodes, the product groups can also be identified by means of barcodes to make it easier for the light robots 15 to recognize the individual product groups.

FIG. 5 shows an illustration of the assembly of product orders. Load racks 58 with picked products are visible here on the left side, wherein two load racks 55 for accommodating ready-to-ship products are shown on the right side. A six-axis robot is identified with 53, which moves essentially on a track 54. A device 57 in the work area of the six-axis robot 53 is used for packing the products. The products can be packed with human help here. The assembly of the products which belong to a specific order is performed on a sorting space 56, and they are then transported to the load rack 55 for ready-to-ship products.

FIG. 6 shows an alternative assembly of product orders.

A picking person 60 is shown in the left part of FIG. 6 at a sorting space 56, in the working area of which, on the one hand, the load racks 58 having picking products and, on the other hand, the load racks 55 for ready-to-ship products can be recognized.

In the right part of FIG. 6, a person 61 is shown working on packing and placing packed products in the form of shipping cartons 62 onto a transport device 63, for example, in the form of a conveyor belt. A transport vehicle having transport material 13 and a load rack 55 for ready-to-ship products is visible in the region of the person 61. The containers 50 shown to the right of the person 61 for picked products can be delivered, for example, by one or multiple transport vehicles.

The transport vehicle shown can, on the one hand, supply transport material from the warehouse or also have ready-to-ship products, for example, from the sorting space 56 or from the load rack 55 loaded in the region of the person 60.

It is also conceivable in this case that the person 60 has products supplied by the described transport vehicles from the warehouse, which are sorted by the person 60 into transportable containers 55. The containers 55 are then brought by transport vehicles or manually to various persons 61 and sorted by these persons into shipping cartons 62 in accordance with the transport task to be fulfilled. In this case, the shipping cartons 62 are moved by the transport device 63 past the persons 61.

The field of use of the transport vehicles according to the invention is only shown here as an example by indicating various transport options.

A known method is preferably used for controlling the described transport vehicles, which was developed by the Technical University of Berlin and was published on 10 Oct. 2007 under:

Dynamic Routing of Automated Guided Vehicles in Real Time.

(Ewgenij Gawrilow, Ekkehard Köhler, Rolf H. Möhring, Björn Stenzel)

[http://www.math.tuberlin.de/coga/publications/techreports/]

This is essentially a two-part algorithm, the first part of which comprises a preparatory step and the second part of which calculates a route in real time and provides a specific time window for each section in this case.

The application of the method described here related to an AGV network in the Altenwerder container terminal in the Hamburg port. The application of the same method to the interference-free operation of automated guided vehicles in a warehouse appears to be novel, in contrast.

The control of the complex movement procedures and the signal processing of the sensors used requires a special control program.

LIST OF REFERENCE NUMERALS 1 carrier plate, lifting plate
2 display screen
3 housing, vehicle housing
4 operating element, emergency stop
5 axis of rotation
6 drive wheel
7 cover of a drive wheel
8 plug connection for charging energy stores
9 front support wheel 10 3D scanner (collision protection)
11 WLAN antenna (mobile hotspot)
12 load rack
13 transport material
14 inductive pickup element for electrical energy
15 light robot
16 rear lift rod
17 positioning element for a rear lift rod
18 positioning element for a front lift rod
19 front lift rod
20 drive wheel, left side
21 rear support wheel
22 servomotor for left-side drive wheel
23 axle bearing for the left-side drive wheel
24 push rod
25 axis of rotation for a front lift rod lever
26 front lift rod lever
27 lift-turn lever
28 joint head
29 toothed belt for the right-side drive
30 servomotor for the right-side drive
31 positioning element, threaded spindle
32 drive for the positioning element 31
33 force transmission from the drive 32 to the positioning element 31
34 wishbone
35 fork head
36 axle lever
37 rear lift rod lever
38 joint for an angle lever 40
39 spring element
40 angle lever
41 front carrier plate suspension
42 sensor for detecting the rotational movement of the left-side drive wheel
43 rear carrier plate suspension
44 storage space for energy stores
45 linkage point of the right spring element on the housing 3
46 gripper magazine
47 quick-release coupling of the gripper
48 light field sensor
49 induction line for energy transmission
50 container for picked products
51 waiting loop
52 picking space having a packing station
53 six-axis robot
54 track of the robot 53
55 load rack for ready-to-ship products
56 sorting space
57 device for packing the products
58 load rack with picking products
59 light field sensor on the transport vehicle
60 picking person
61 shipping and packing person
62 shipping cartons
63 transport device/shipping

The invention claimed is:

1. A device for picking orders largely by machine in warehouses by means of independently freely movable transport vehicles, comprising:
   a) a vehicle housing (3) having a carrier plate (1) for receiving and transporting a load rack (12) with transport material (13), having two drive wheels (6), which are separately driven on both sides in the middle of the vehicle housing (3) on a separately mounted axis of rotation (5) in each case, wherein at least one support wheel (9, 21) is provided in each case on a front side and on a rear side of the vehicle housing (9), and wherein the carrier plate (1) carries a load rack (12) with a light robot (15) having means for grasping products,
   b) a wishbone (34) which connects drive wheels (6), which are pivotable about the axis of rotation (5) in each case via an angle lever (40) so that the drive wheels can execute vertical movements independently of one another,
   c) a centrally arranged positioning element (31), which, via a lift-turn lever (27) and a pushrod (24) connected thereto, can move two front lift rods (19) and two rear lift rods (16) to raise or lower the carrier plate (1),
   d) at least one 3D scanner (10) as well as at least one WLAN antenna (11) in a front region of the vehicle housing (3),
   e) the light robot (15) has a light field sensor (48) in the region of the means for grasping products and the vehicle housing (3) has at least one light field sensor (59) in the front region,
   wherein the light robot (15) takes the gripper means determined to be suitable in each case from a gripper magazine (46) by means of a quick-release coupling (47) to be actuated automatically.

2. The device as claimed in claim 1, wherein a system for power supply of the transport vehicle is provided, which ensures the supply of electric, liquid, or gaseous energy either via inductive lines laid in the floor, by means of an inductive pickup element (14), or via stationary approachable energy supply stations, wherein a storage space (28) for corresponding energy stores is provided in the vehicle housing (3).

3. The device as claimed in claim 1, wherein the center of gravity of a load rack (12) is detected by means of sensors, and the result of such a center of gravity determination is used to correct the center of gravity location by means of a controller of positioning elements (18) and (17) for the lift rods (19) and (16).

4. The device as claimed in claim 1, wherein the light field sensors (48) and (59) in the form of hundreds of mini-lenses collect items of optical information according to the light field principle, which can then be assembled later into images having a desired resolution and/or a desired viewing angle by data processing.

5. A method for picking orders largely by machine in warehouses by means of a plurality of the independently freely movable transport vehicles as defined in claim 1, comprising:
   a) providing a control center in a storage region adapted to receive an order and ensure that a part of a product group is transported in a specific load rack (12) to a specific destination,
   b) selecting, via the control center, one of the transport vehicles based on its present location and order status,
   c) communicating, via the control center, the order and instructions to the selected transport vehicle with a loaded light robot (15) to seek a specific load rack (12) having a specific product group in a specific area of a larger area of a storage region, to remove an exemplar of this product group by means of the light robot (15), to supply a container with transport material (13), and to travel to a specific storage space, wherein the transport vehicle selected by the control center receives the instructions, with respect to a specific route and speed to be traveled to reach a target region in a specific time window, and d) instructing the selected transport vehicle to deliver the exemplar of the product group to a first load rack (58) having picking product, in a region of a picking person (60), or in a region of a shipping and packing person (61).

6. The method as claimed in claim 5, wherein the picking product is configured to be stored by the picking person (60) in a transport container and transported to various the region of the shipping and packing person (61).

7. The method as claimed in claim 5, wherein instead of the persons (60) and (61), a six-axis robot (53) in a region of a sorting space (56) is instructed to collect the product group associated with the order and delivers the product group to a device (57) for product packing, wherein the device (57) is adapted to bring the product group to a second load rack (55) for ready-to-ship products after the packing.

8. The method as claimed in claim 5, wherein the specific load rack (12) comprises a center of gravity and gradient, the method further comprising:
    detecting the center of gravity by means of a sensor, wherein the detected center of gravity is used to control positioning elements (18) and (17) for lift rods (19) and (16), and
    detecting the gradient of the specific load rack (12) by means of a gradient sensor.

9. The method as claimed in claim 5, wherein each of the plurality of independently freely movable transport vehicles comprises a sensor (42) that is adapted to detect a rotational movement of the drive wheels (6), and determine slip on each drive wheel (6) as a function of the speed of the transport vehicle.

10. A device for picking orders largely by machine in warehouses by means of independently freely movable transport vehicles, comprising:
    a) a vehicle housing (3) having a carrier plate (1) for receiving and transporting a load rack (12) with transport material (13), having two drive wheels (6), which are separately driven on both sides in the middle of the vehicle housing (3) on a separately mounted axis of rotation (5) in each case, wherein at least one support wheel (9, 21) is provided in each case on a front side and on a rear side of the vehicle housing (9), and wherein the carrier plate (1) carries a load rack (12) with a light robot (15) having means for grasping products,
    b) a wishbone (34) which connects drive wheels (6), which are pivotable about the axis of rotation (5) in each case via an angle lever (40) so that the drive wheels can execute vertical movements independently of one another,
    c) a centrally arranged positioning element (31), which, via a lift-turn lever (27) and a pushrod (24) connected thereto, can move two front lift rods (19) and two rear lift rods (16) to raise or lower the carrier plate (1),
    d) at least one 3D scanner (10) as well as at least one WLAN antenna (11) in a front region of the vehicle housing (3),
    e) the light robot (15) has a light field sensor (48) in the region of the means for grasping products and the vehicle housing (3) has at least one light field sensor (59) in the front region;
    wherein the center of gravity of a load rack (12) is detected by means of sensors, and the result of such a center of gravity determination is used to correct the center of gravity location by means of a controller of positioning elements (18) and (17) for the lift rods (19) and (16).

11. The device as claimed in claim 10, wherein the light robot (15) takes the gripper means determined to be suitable in each case from a gripper magazine (46) by means of a quick-release coupling (47) to be actuated automatically.

12. The device as claimed in claim 10, wherein a system for power supply of the transport vehicle is provided, which ensures the supply of electric, liquid, or gaseous energy either via inductive lines laid in the floor, by means of an inductive pickup element (14), or via stationary approachable energy supply stations, wherein a storage space (28) for corresponding energy stores is provided in the vehicle housing (3).

13. The device as claimed in claim 10, wherein the light field sensors (48) and (59) in the form of hundreds of mini-lenses collect items of optical information according to the light field principle, which can then be assembled later into images having a desired resolution and/or a desired viewing angle by data processing.

* * * * *